US006269086B1

(12) United States Patent
Magana et al.

(10) Patent No.: US 6,269,086 B1
(45) Date of Patent: Jul. 31, 2001

(54) ARRANGEMENT AND METHOD FOR SELECTABLE TIME/FREQUENCY DIVISION MULTIPLEX COMMUNICATION

(75) Inventors: Javier V. Magana; Christopher L. McCrank, both of Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/031,896

(22) Filed: Feb. 27, 1998

(51) Int. Cl.[7] .................................................. H04J 3/00
(52) U.S. Cl. ............................................ 370/280; 370/281
(58) Field of Search .................................. 370/344, 252, 370/280, 281, 347, 350, 277, 519, 478, 436, 465

(56) References Cited

U.S. PATENT DOCUMENTS 5,475,677 * 12/1995 Arnold et al. ........................... 370/29
5,881,369 * 3/1999 Dean et al. ............................... 455/78
6,094,421 * 7/2000 Scott ..................................... 370/280

OTHER PUBLICATIONS

"AM79C413 CT2 PhoX™ Controller for Digital Cordless Telephones" Technical Manual, 101 pages (1997).
"AM79C433 ISM PhoX™ Controller for Digital Cordless Telephones" Technical Manual, 106 pages (1997).
"AMD Am79C410A CT2 PhoX Controller(™) Product Brief", http://www.amd.com/products/cpd/prodover/phox/18550a.html: 3 pages (Oct. 23, 1997).
"AMD Am79C411 CT2 PhoX Controller(™) Product Brief", http://www.amd.com/products/cpd/prodover/phox/19697a.html: 2 pages (Oct. 23, 1997).
"AMD Am79C412 CT2 PhoX Controller(™) Product Brief", http://www.amd.com/products/cpd/prodover/phox/19704a.html: 3 pages (Oct. 23, 1997).
"AMD Phox 410 Tech Manual", http://www.amd.com/products/cpd/techdocs/18515a/18515a.html: 3 pages (Oct. 23, 1997).
"AMD PhoX™ Family of Wireless Communication Controllers: An Integrated Solution for Cordless Communications—For the Next Generation of Digital Applications", http://www.amd.com/products/cpd/prodover/phox/phox-over.html: 2 pages (Oct. 23, 1997).
"AMD Product Brief: Am79C432 ISM PhoX™ Controller for Digital Cordless Telephones", http://www.amd.com/products/cpd/prodover/phox/20690a.html: 3 pages (Oct. 23, 1997).
Magana, J., U.S. Patent Application Docket No. 18799.56, filed Dec. 4, 1995 entitled "System and Method for Frequency Division Duplex/Time Division Duplex Radio Frequency Communications", 38 pages.
Magana, J., U.S. Patent Application having Docket No. 18799.55, filed Apr. 29, 1997 entitled "Secondary Channel for Radio Frequency Communications", 21 pages.

* cited by examiner

Primary Examiner—Chau Nguyen
Assistant Examiner—Alexander O. Boakye
(74) Attorney, Agent, or Firm—Williams, Morgan & Amerson

(57) ABSTRACT

A cordless telephone provides extended operating range and battery life. In one embodiment, a time division duplex communications protocol is used when the measured signal strength or the signal quality between the handset and a corresponding base unit does not satisfy a known criteria, such as a predetermined threshold. The telephone is also configured to operate using a frequency division duplex communications protocol when the signal strength or signal quality between the handset and the base unit satisfies the known criteria. Other aspects of the invention are directed to measuring the received signal strength of the communications channel after initial communications is established, and selecting the communications protocol that is most advantageous in light of the measured signal strength and/or signal conditions.

15 Claims, 4 Drawing Sheets

ARRANGEMENT AND METHOD FOR SELECTABLE TIME/FREQUENCY DIVISION MULTIPLEX COMMUNICATION

FIELD OF THE INVENTION

The present invention relates to an apparatus and method of operation of a wireless telephone system.

BACKGROUND OF THE INVENTION

Radio components are some of the most expensive parts of radio frequency (RF) communications equipment. This is particularly the case in cordless or wireless telephone. In RF communications, and particularly, in cordless or wireless telephone, costs and operational requirements can be very important to the success of communications equipment designs. Engineering such equipment often involves design constraints imposed or dictated by costs of components or by operational requirements. Such costs and operational requirements are particularly important considerations when communications equipment is intended for consumer-level uses and household-type markets.

Various standards, established by the RF communication technology, industry and other sources, often dictate aspects of performance and equipment requirements. Standards have been established, for example, for cordless or wireless telephone products and other communications devices. Certain of the most common standards of the cordless telephone industry include the Cordless Telephone Second Generation (CT2) standard, the European Conference of Postal and Telecommunications Administrations (CEPT) standard which is also referred to as the Cordless Telephone First Generation (CT1) standard, the Cordless Telephone First Generation Plus (CT1+) standard, and the digital European Cordless Telecommunications (DECT) standard, among others.

The CT2 standard, for example, employs a time division duplex (TDD) system and methodology. In TDD, transmit and receive communications occur among two stations, such as a handset and base set unit of a cordless telephone, in a burst manner at distinct intervals of time. In the past, devices conforming to CT2 have transmitted and received over an identical carrier frequency within the bandwidth dictated by the standard. Communications have been possible in TDD units because different time intervals are employed for transmissions and receptions by each station. During an interval that one station is transmitting, the other is receiving, and vice versa, all over the same bandwidth. Devices built according to the CT2 standardhave been considered lower-end devices, that is, the devices are typically low-cost to consumers. This low cost is partly attributable to the use in those devices of only a single radio front end. That is possible in CT2 devices because communications occur over the same carrier frequency in the TDD manner. The prior TDD devices, however, at least those devices conforming to the CT2 standard, have implemented the TDD methodology using a single carrier frequency. It has previously been thought that use of limited bandwidth through implementation of TDD methodology over a single carrier frequency provides the greatest advantages. This has not necessarily resulted, however, in the lowest cost for the prior TDD devices.

Other cordless telephone standards, such as the CT1 standard, at times have employed a frequency division duplex (FDD) concept. In typical FDD, transmit and receive communications occur over two distinct, separate carrier channels. Thus, two FDD communications stations, such as, for example, a handset unit and a base set unit of a cordless telephone, each transmit and receive over different carrier channels. While a first unit is transmitting over a particular channel, the second unit is receiving on that same channel. The second unit transmits on a different channel, and the first unit receives on that different channel. FDD systems have tended to be more expensive than TDD systems because additional radio front end components have been required in prior FDD systems in order to accomplish the transmissions and receptions over the separate channels.

In addition, FDD systems use more power to operate the additional circuitry necessary to utilize multiple carrier frequencies as compared to TDD systems. This additional disadvantage for FDD systems contributes to a reduction in the useful battery life for the handset in FDD systems as compared to TDD systems. Providing a cordless communication system with the longest possible useful battery life is a desirable design goal of all cordless communication systems.

FDD systems, however, possess an advantage over TDD systems in that the addition of the additional communication channel in the FDD system allows the communications data rate for each of the channels to be one-half of the rate used by the TDD system that provides the same total communication capacity. The halving of the data rate used by each channel increases the energy per bit provided by the FDD system. This in turn permits the link quality to be more robust than a TDD system operating in the same environment. This reduction in the bit error rate for the FDD channel increases the effective usable range of the cordless communications system by providing an improved signal-to-noise ratio.

There are certain advantages in selecting a particular type of radio frequency communications and, in particular, for communications involving cordless telephone. For example, TDD methods can be advantageous because of the minimal spectrum necessary for such communications and the reduced power consumption for these systems. FDD methods provide advantages of continuous transmission and reception while permitting lower data rates which in turn provide lower bit error rates and correspondingly greater operating range. Traditionally, system requirements lead to selection of one type, along with its advantages, and not the advantages of the other type.

SUMMARY OF THE INVENTION

The present invention is directed to a cordless telephone apparatus and method of use thereof In one particular embodiment, a cordless telephone apparatus includes a battery-powered handset and a base unit. The battery-powered handset is configured and arranged to operate using a TDD communications protocol when the measured signal strength or the signal quality between the handset and the base unit is strong, and is configured and arranged to operate using a FDD communications protocol when the measured signal strength or the signal quality between the handset and the base unit is not strong, for example, is degrading.

According to another aspect of the present invention, a method of operation of a cordless telephone apparatus capable of operating using both TDD and FDD communications protocol comprises establishing communication between the handset and base unit of the cordless telephone, measuring a value for the received signal strength for the communications channel used to communicate between the handset and base unit, selecting and using the FDD protocol if the received signal strength is less than a threshold value, and selecting and using the TDD protocol if the received signal strength is greater than or equal to a threshold value.

The above summary of the present invention is not intended to describe each illustrated embodiment or every implementation of the present invention.

BRIEF DESCRIPTION OF THE DRAWINGS

The invention may be more completely understood in consideration of the subsequently presented detailed description of various embodiments of the invention in connection with the accompanying drawings, in which.

Figure 1:
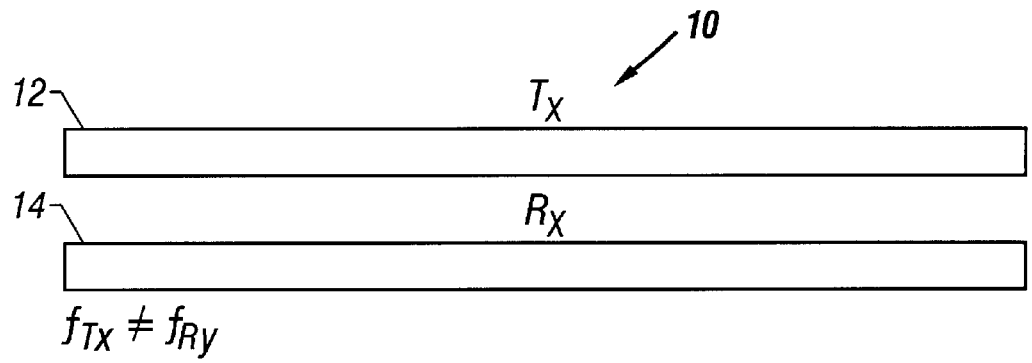
FIG. 1 is an illustration of transmit and receive signals by an RF communications unit employing a conventional FDD methodology, wherein transmit and receive signals pass over different frequency channels.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention may be applicable to a variety of systems and arrangements which communicate between devices using various RF communications protocols. The invention has been found to be particularly advantageous in application environments where cordless telephone systems utilize one or more RF communications protocols to perform data and continue communications between handset and base units. An appreciation of various aspects of the invention is best gained through a discussion of application examples operating in such an environment.

FIG. 1 is a diagram of transmit ($T_x$,) and receive ($R_x$) communications sequences 12,14 of a device operating according to a conventional FDD protocol. FDD signal transmissions are provided over a first carrier frequency and signal receptions are provided over a second carrier frequency. In the illustration of FIG. 1, the transmission over time is depicted by the sequence 12 and the reception over time is depicted by the sequence 14. The vertical displacement of the two sequences is employed to indicate that two separate carrier frequencies serve for the transmission and for the reception. The same displacement representation is used in FIG. 3 for the same reason. In the presentation of FIG. 1, as well as FIGS. 2 and 3, time progresses in passing from left to right across the page.

Still referring to FIG. 1, this particular example FDD methodology is similar to cordless telephones operating according to the CT1 standard in which modulated analog data sequences 12, 14 are passed between communication devices. Operation over separate frequencies has previously required more devices or components, such as radio components leading to relatively expensive implementations. Also, because FDD operations occur over the separate frequencies for transmission and reception, more spectrum may be used up in FDD communications, at least in comparison to typical TDD communications.

Figure 2:
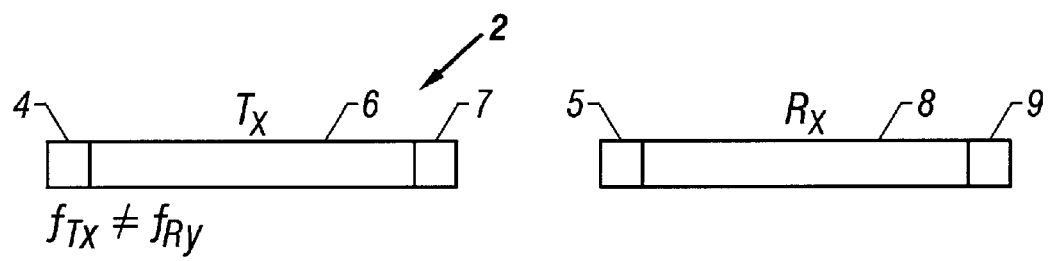
FIG. 2 is an illustration of transmit and receive signals of a RE communications unit employing a conventional TDD approach, wherein both transmission and reception occur over the same frequency channel.

FIG. 2 is a diagram of the transmit signal and receive signal 5 sequences of a conventional TDD communications using the CT2 standard for cordless phones. In TDD communications, the communications are digitized by converting the communications, for example, voice or data, into a sequence of binary patterns. The sequence of digital binary patterns is then buffered and transmitted at a high rate in bursts at distinct intervals of time. Only a single carrier frequency may be necessary for TDD communications. Time division of transmissions and receptions into distinct time intervals allows both receive and transmit signals to be accomplished over the single frequency.

Continuing to refer to FIG. 2, both the left and right sequences represent digitized communications being transmitted and received throughout periods of time. The sequence on the left represents a transmission ($T_x$) signal having bit groupings 4, 6, 7. The transmission may include certain beginning transmit control bits 4 and certain transmitted information bits 6. The information bits 6 may, for example, be digitized voice or data signals. The transmission may also include end control bits 7. The transmission occurs on a particular carrier frequency and is burst over distinct intervals of time.

Further still referring to FIG. 2, communicated information is transmitted -and received over the same carrier frequency, at different intervals of time, for example, at two-millisecond time intervals as set forth in the CT2 standard. The interval of time for reception () is different from the interval of the transmission ($T_x$). The reception may include beginning control bits 5, received information bits 8 and ending control bits 9.

In one embodiment the CT2 standard provides that 66 bits can be transmitted 4, 6, 7 or received 5, 8, 9 by a CT2 device each in one millisecond of time. A disadvantage of such communications devices has been their cost due to the need for additional components. The components are required for additional filters used to attenuate frequency spurs created in mixing the transmit and receive channels onto a single carrier frequency.

Figure 3:
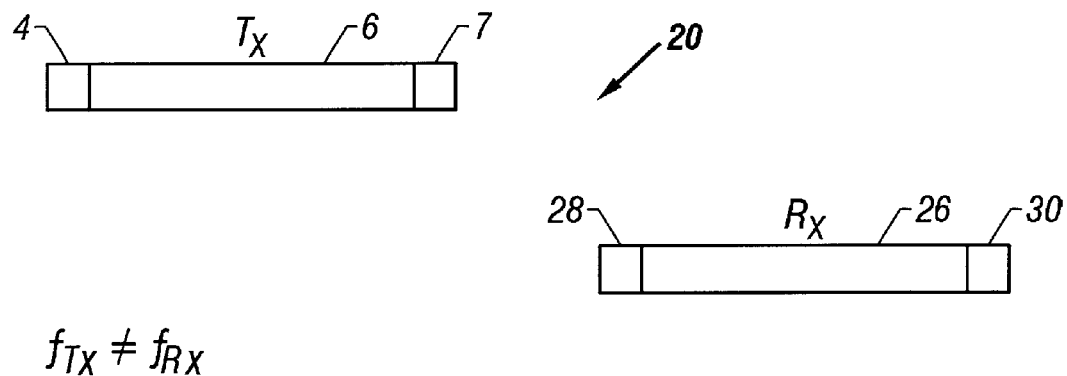
FIG. 3 is an illustration of transmissions and receptions by a unit employing a TDD/FDD RF communications approach, according to one example embodiment of the present invention.

FIG. 3 is a diagram of the transmission (4, 6, 7) and reception (28, 26, 30) signal sequences according to an example embodiment of the present invention. In this FDD/TDD approach, the radio front end of an RF communications device is designed and configured to employ both FDD and TDD. Such an RF communications unit, or front end, may be employed with a telephone that operates according to TDD methodology, such as one conforming to the CT2 standard. The FDD/TDD approach can be viewed as employing a dual duplex design, involving a first carrier channel for transmissions and a different, second carrier channel for receptions. Over each carrier channel, communications are passed in bursts of distinct time intervals in a time division manner. Transmission occurs over a first carrier channel in a distinct time interval. Over a different, second carrier channel, reception occurs at a different, distinct time interval. In this manner, communications by transmissions and receptions occur in distinct and different time intervals, over different carrier frequencies. For further information concerning a cordless telephone system utilizing an FDD/TDD communication protocol, reference may be made to U.S. Patent application 08/567,133, filed Dec. 4, 1995, entitled "System and Method for Frequency Division Duplex/Time Division Duplex Radio Frequency Communications," incorporated herein by reference.

Figure 4A:
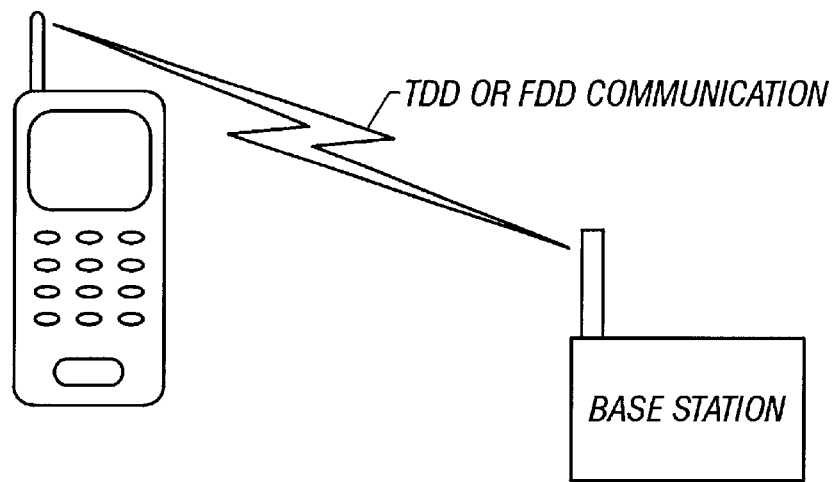
FIGS. 4a and 4b are block diagrams of example embodiments of cordless telephone systems, according to the present invention.

Referring to FIG. 4a, an example embodiment of a cordless telephone arrangement involves a base unit and a handset which communicate with each other using one of any number of communications protocol. In one application, these protocols include the CT2 specification using a TDD protocol. In another application, this communications protocol uses the CT1 standard with the FDD communications protocol. According to the present invention, useful battery life of the telephone handset is extended by selectively utilizing both the TDD and the FDD communications protocols, when appropriate, based upon the measured signal strength between the two units.

Figure 4B:
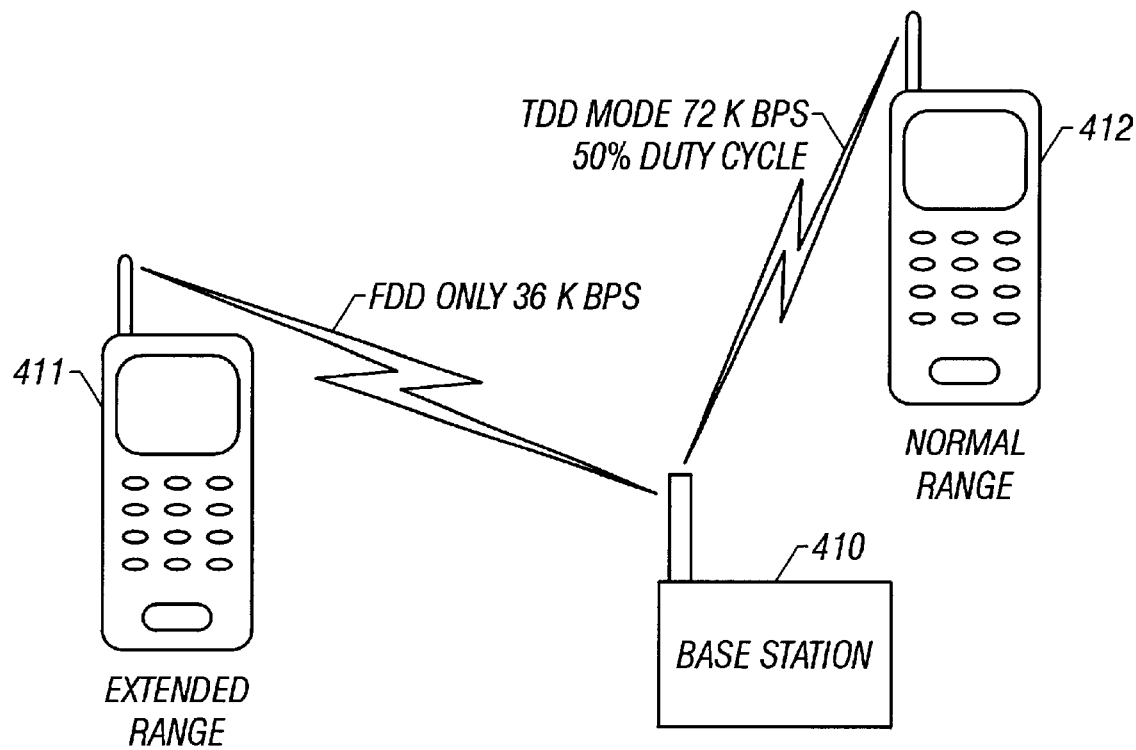

Referring to FIG. 4b, an example embodiment of the present invention is disclosed. In an extended-range operation, occurring when the measured signal strength between the base unit 410 and the handset 411 is less than a predetermined threshold, these two devices use the FDD protocol in which the base unit and handset communicate with each other using two separate communications channels operating at a lower data rate than possible in TDD/FDD communication mode, such as 36 kbps, 48 kbps, etc. In this mode, communications between the base unit can occur simultaneously with the communications from the handset back to the base unit over these two separate channels. Conventional circuits, such as receive signal strength indicators (RSSI), can be used to provide the threshold criteria.

In alternative embodiments of the present invention, determining whether the received signal is acceptable (for example, sufficiently strong to maintain a conversation without audibly detectable interference) to select FDD strong is accomplished using one of a combination of the following: comparing the received signal strength to a threshold level; monitoring the received signal strength over a period of time and comparing the gradient of the monitored received signal strength to a known criteria; and detecting a substantial degradation (such as jitter or missing data bits) in the received signal.

In the normal range mode of operations, base unit 410 communicates with handset 412 using a TDD communications protocol in which the communications between the base unit and the handset operate, for example, at an aggregate bit rate of 72 kbps. However, the transmitter and receiver operate at a fifty-percent duty cycle such that each is on, or active, only one-half of the time. The effect of this arrangement is that the total communications capacity of the communications channel between the base unit and handset is the same as the capacity found in the extended range mode operating at one-half of the bit transfer rate. The lower bit transfer rate found in the extended range operation provides more energy per bit being transferred, thus allowing a lower bit error rate for a given range, and allowing the handset to operate at an extended range while permitting effective communications between the handset and the base station.

Figure 5A:
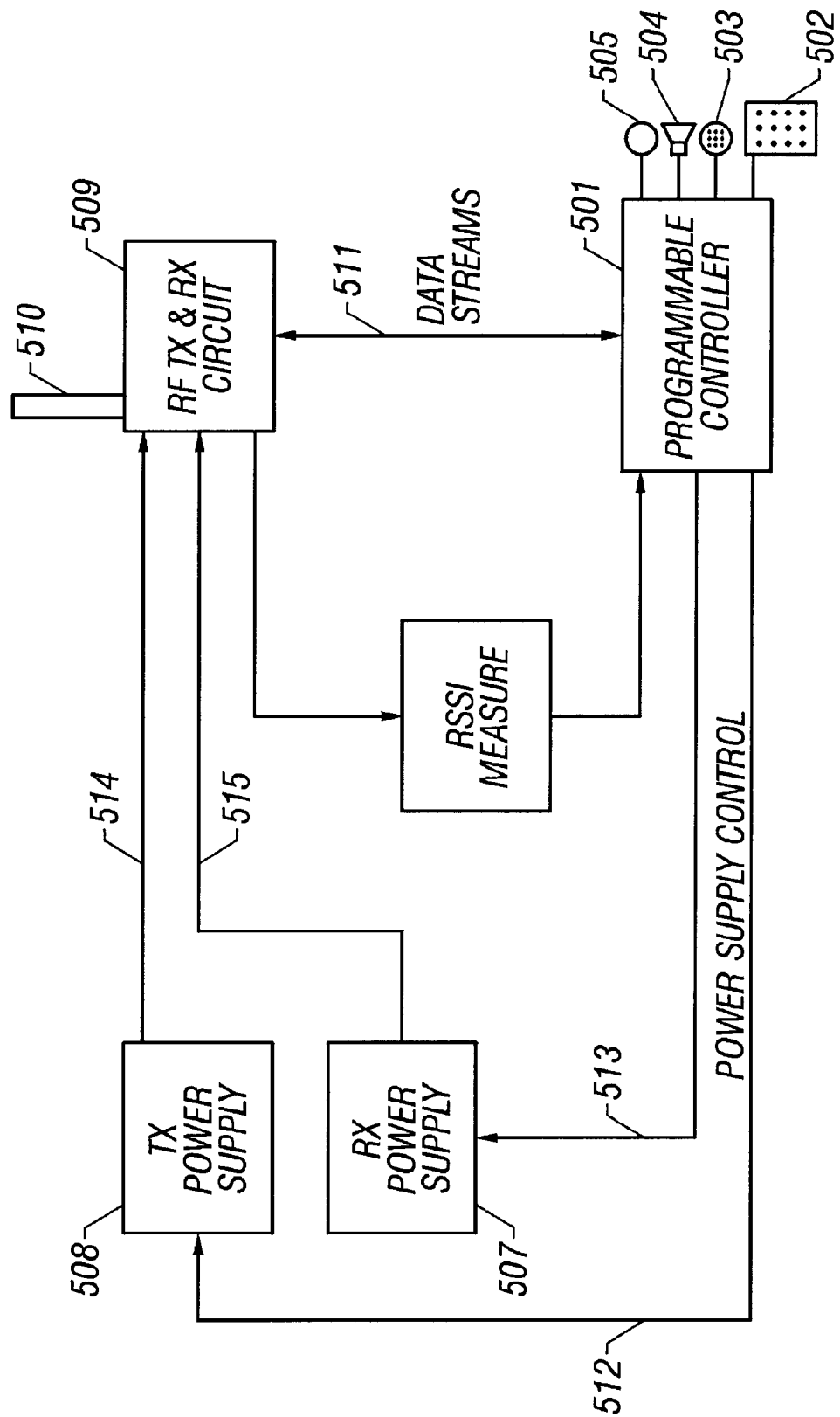
FIGS. 5a and 5b are block diagrams of example embodiments of cordless telephone handset and base unit apparatus, also according to the present invention.

Referring to FIG. 5a, the cordless telephone handset is operated under the control of a programmable controller 501. Depending on the particular application, the controller is implemented using programmable processing devices. The AMD 79C413, 79C433 and 79C434 processing devices are examples of such devices. For further information concerning such devices, reference may be made to the related technical literature, including the Technical Manuals entitled, "Am79C413 CT2 PhoX ™ Controller for Digital Cordless Telephones" and "Am79C433 ISM PhoX™ Controller for Digital Cordless Telephones", filed herewith and incorporated herein by reference. The controller interacts directly with the telephone ringer 505, the telephone handset speaker 504, the microphone for the telephone 503 and keypad used to dial the telephone numbers 502. This controller device 501 transmits digital data streams 511 directly to RF transmit and receive circuitry 509 for ultimate transmission using the antenna 510. The controller device 501 also provides control signals 512 and 515 to the transmit and receive power supply control circuitry 507 and 508 respectfully which control the operation of the RF transmit and receive circuitry. These power supplies are turned on and off periodically to conserve power of this battery operated device.

The controller device 501 also accepts measurement data from received signal strength measurement circuitry 506 to obtain an indication of the receive signal strength from the RF circuitry. In one particular embodiment, the received signal strength measurement circuitry 506 generates its signal measurement by monitoring the current draw in the amplifier limiter stages of the RF circuitry.

The controller device, implemented as a programmable microcontroller, is programmed with the necessary software to perform the communications protocol switching of the claimed invention as described previously. This processing device can be implemented in any number of implementations which accomplish the same described function.

Figure 5B:
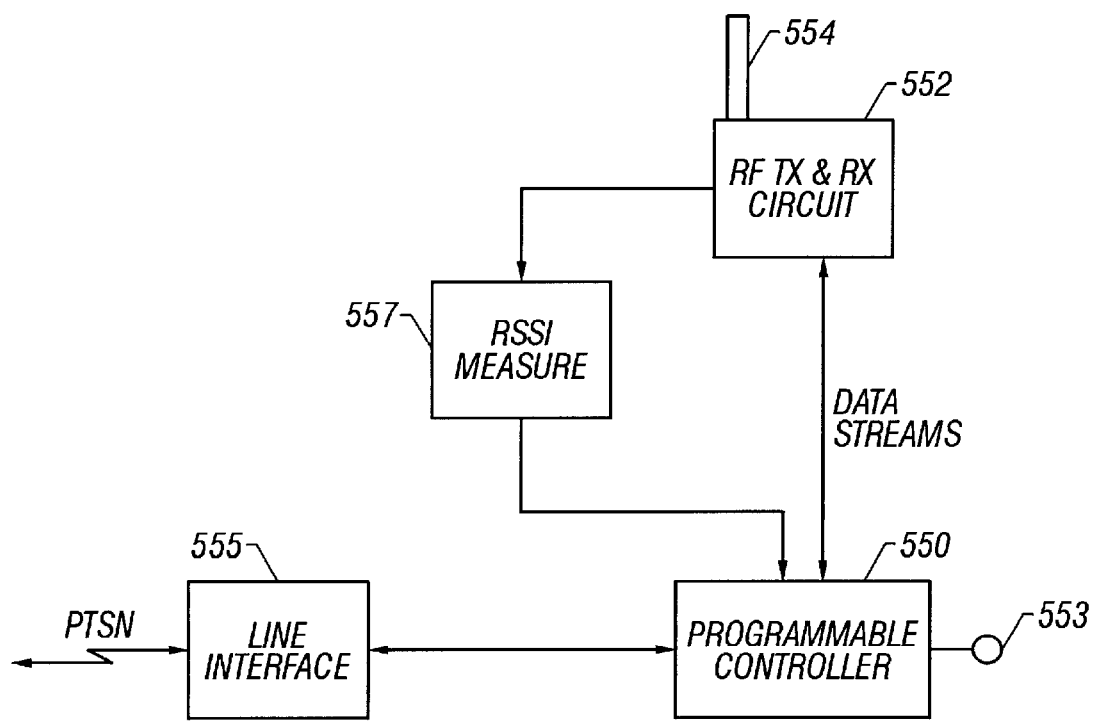

Referring to FIG. 5b, a base unit for the cordless telephone apparatus once again consists of a programmable controller 550 which interacts with a telephone ringer 553 and received signal strength measurement circuitry 551 and the RF transmit and receive circuitry 552 with its corresponding antenna 554 its operation as described in the handset. The handset also has a telephone line interface 555 which provides the necessary connection to an outside telephone system, a central office, a private PBX or its equivalent.

As those skilled in the art will readily appreciate, the FDD/TDD embodiments described herein provide significant improvements and advantages over the prior technology. Those skilled in the art will readily recognize the numerous variations and substitutions that may be made in the system and method and their use and configuration to achieve substantially the same results as achieved by the example embodiments expressly described herein. The foregoing detailed description is, thus, to be clearly understood as being given by way of illustration and example only, the spirit and scope of the present invention being limited solely by the appended claims.

We claim:

1. A method for selecting a communication protocol for communicating between a handset and a base unit of a cordless telephone arrangement, comprising :
    establishing communication between the handset and the base unit;
    determining whether the received signal strength is strong;
    selecting a frequency division duplex protocol for communication in response to the received signal strength determined as not being strong;
    selecting a time division duplex protocol for communication in response to the received signal strength determined as being strong; and using the selected protocol to communicate between the handset and the base unit.

2. The method according to claim 1, wherein the selection of the protocol is performed in response to at least one of the following two conditions occurring: when a user initiates a call, and when a call is received by the handset and the base unit apparatus.

3. A method for selecting a communication protocol for communicating between a handset and a base unit of a cordless telephone arrangement, comprising:
   establishing communication between the handset and the base unit;
   determining whether the received signal strength is strong;
   selecting a frequency division duplex protocol for communication in response to the received signal strength determined as not being strong;
   selecting a time division duplex protocol for communication in response to the received signal strength determined as being strong: and
   using the selected protocol to communicate between the handset and the base unit;
   wherein determining whether the received signal strength is strong is accomplished using at least one of comparing the received signal strength to a threshold level, monitoring the received signal strength over a period of time and comparing the gradient of the monitored received signal strength to a known criteria, and detecting a degradation in the received signal.

4. The method according to claim 1, wherein the selection of the protocol is performed periodically while communication between the handset and base unit is on-going.

5. The method according to claim 4, wherein the periodic rate in which the protocol selection process repeats is set by the handset.

6. The method according to claim 4, wherein the periodic rate in which the protocol selection process repeats is set by the base unit.

7. A cordless telephone arrangement capable of selecting a communication protocol for communicating between a handset and a base, comprising:
   means for establishing communication between the handset and the base unit;
   means for determining whether the signal strength is strong;
   means for selecting a frequency division duplex protocol for communication in response to the received signal strength determined as not being strong, and selecting a time division duplex protocol for communication in response to the received signal strength determined as being strong; and
   means for using the selected protocol to communicate between the handset and the base unit.

8. A cordless telephone arrangement capable of selecting a communication protocol for communicating between a handset and a base comprising:
   means for establishing communication between the handset and the base unit;
   means for determining whether the signal strength is strong;
   means for selecting a frequency division duplex protocol for communication in response to the received signal strength determined as not being strong, and selecting a time division duplex protocol for communication in response to the received signal strength determined as being strong; and
   means for using the selected protocol to communicate between the handset and the base unit;
   wherein the means for selecting is responsive to at least one of a user initiating a call, and an incoming call.

9. A cordless telephone arrangement capable of selecting a communication protocol for communicating between a handset and a base, comprising:
   means for establishing communication between the handset and the base unit;
   means for determining whether the signal strength is strong;
   means for selecting a frequency division duplex protocol for communication in response to the received signal strength determined as not being strong, and selecting a time division duplex protocol for communication in response to the received signal strength determined as being strong; and
   means for using the selected protocol to communicate between the handset and the base unit;
   wherein the means for determining whether the received signal strength is strong is accomplished using at least one of comparing the received signal strength to a threshold level, monitoring the received signal strength over a period of time and comparing the gradient of the monitored received signal strength to a known criteria, and detecting a degradation in the received signal.

10. The cordless telephone arrangement according to claim 7, wherein the means for selecting further includes selecting one of the protocols while communication between the handset and base unit is on-going.

11. The cordless telephone arrangement according to claim 10, wherein the periodic rate in which the protocol selection means repeats is set by the handset.

12. The cordless telephone arrangement according to claim 10, wherein the periodic rate in which the protocol selection means repeats is set by the base unit.

13. A cordless telephone apparatus capable of selecting a communications protocol for communicating between a handset and a base unit over a communications channel which utilize both a frequency division duplex communications protocol and a time division duplex communications protocol, comprising:
   the handset including
      a first radio frequency transmitter/receiver configured to measure the received signal strength over the communications channel in use for communications between the handset and base unit,
      a first programmable processor,
      a first received signal strength indicator configured to provide a value corresponding to the received signal strength measured by the first radio frequency transmitter/receiver to the first programmable processor, and the first programmable processor configured to receive the measured received signal strength value from the first received signal strength indicator and to select the frequency division duplex communications protocol for use in communicating between the handset and base unit if the measured received signal strength value is less than a threshold value, and the first processor further configured to select the time division duplex communications protocol for use in communicating between the handset and the base unit if the measured received signal strength value is greater than or equal to the threshold value; and
   the base unit including a second radio frequency transmitter/receiver configured to measure the received signal strength over the communications channel in use for communications between the handset and base unit, a second programmable processor, a second received signal strength indicator which provides a value corresponding to the received signal strength measured by the second radio frequency transmitter/receiver to the second programmable processor, and wherein the second programmable processor is configured to receive the measured received signal strength value from the second received signal strength indicator and to select the frequency division duplex communications protocol for use in communicating between the handset and base unit if the measured received signal strength value is less than the threshold value, and the second processor is further configured to select the time division duplex communications protocol for use in communicating between the handset and base unit if the measured received signal strength value is greater than or equal to the threshold value.

14. A base unit which is part of a cordless telephone apparatus, wherein the base unit is capable of selecting a communications protocol for communicating between a handset and a base unit over a communications channel which utilize both a frequency division duplex communications protocol and a time division duplex communications protocol, comprising:

a radio frequency transmitter/receiver capable of measuring the received signal strength over the communications channel in use for communications between the handset and base unit;

a received signal strength indicator which provides a value corresponding to the received signal strength measured by the radio frequency transmitter/receiver to a programmable processor; and the programmable processor, wherein the processor receives the measured received signal strength value from the received signal strength indicator and selects the frequency division duplex communications protocol for use in communicating between the handset and base unit if the measured received signal strength value is less than a threshold value, and the processor further selects the time division duplex communications protocol for use in communicating between the handset and base unit if the measured received signal strength value is greater than or equal to the threshold value.

15. A handset which is part of a cordless telephone apparatus, wherein the handset is capable of selecting a communications protocol for communicating between a handset and a base unit over a communications channel which utilize both a frequency division duplex communications protocol and a time division duplex communications protocol, comprising:

a radio transmitter/receiver capable of measuring the received signal strength over the communications channel in use for communications between the handset and base unit;

a receive signal strength indicator which provides a value corresponding to the received signal strength measured by the radio frequency transmitter/receiver to a programmable processor; and the programmable processor, wherein the processor receives the measured received signal strength value from the received signal strength indicator and selects the frequency division duplex communications protocol for use in communicating between the handset and base unit if the measured received signal strength value is less than a threshold value, and the processor further selects the time division duplex communications protocol for use in communicating between the handset and base unit if the measured received signal strength value is greater than or equal to the threshold value.

\* \* \* \* \*